United States Patent
Lee (10) Patent No.: US 7,761,051 B2
(45) Date of Patent: Jul. 20, 2010

(54) METHOD FOR RECEIVING DATA OF MOBILE TERMINAL AND APPARATUS THEREOF

(75) Inventor: Jae-Moo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 832 days.

(21) Appl. No.: 11/531,641

(22) Filed: Sep. 13, 2006

(65) Prior Publication Data

US 2007/0060051 A1 Mar. 15, 2007

(30) Foreign Application Priority Data

Sep. 13, 2005 (KR) ...................... 10-2005-0085348

(51) Int. Cl.
*H04B 7/15* (2006.01)
(52) U.S. Cl. .................. 455/11.1; 455/13.1; 455/16; 455/20; 455/62; 455/455; 455/503; 455/501; 370/266; 370/274; 370/315; 370/492; 370/501; 375/211
(58) Field of Classification Search .............. 455/11.1, 455/13.1, 7, 9, 16, 18, 20, 22, 24, 62, 41.2, 455/408, 445, 450, 455, 462, 503, 560; 370/226, 370/274, 278, 315, 351, 492, 498, 501; 375/211, 375/214, 356
See application file for complete search history.

(56) References Cited

U.S. PATENT DOCUMENTS

| | | | | |
|---|---|---|---|---|
| 6,665,521 | B1 * | 12/2003 | Gorday et al. | 455/67.11 |
| 6,690,657 | B1 * | 2/2004 | Lau et al. | 370/315 |
| 2001/0036810 | A1 * | 11/2001 | Larsen | 455/11.1 |
| 2004/0192204 | A1 * | 9/2004 | Periyalwar et al. | 455/25 |
| 2005/0048914 | A1 * | 3/2005 | Sartori et al. | 455/11.1 |

FOREIGN PATENT DOCUMENTS

KR 10 2003 0005515 A 1/2003

* cited by examiner

*Primary Examiner*—Matthew D Anderson
*Assistant Examiner*—Shaima Q Aminzay
(74) *Attorney, Agent, or Firm*—Lee, Hong, Degerman, Kang & Waimey

(57) ABSTRACT

A method for receiving data in a mobile terminal and the apparatus thereof according to the present invention can reduce the areas incapable of data reception by allowing a user's mobile terminal to receive data from a first mobile terminal with a good data reception state that receives data from a base station, rather than the user's mobile terminal directly receiving data from the base station. The user's mobile terminal receives the received data from the first mobile terminal having the good reception state by a wireless communication method.

27 Claims, 5 Drawing Sheets

METHOD FOR RECEIVING DATA OF MOBILE TERMINAL AND APPARATUS THEREOF

CROSS-REFERENCE TO RELATED APPLICATIONS

Pursuant to 35 U.S.C. §119(a), this application claims the benefit of earlier filing date and right of priority to Korean Application No. 85348/2005, filed on Sep. 13, 2005, the contents of which are hereby incorporated by reference herein in their entirety.

FIELD OF THE INVENTION

The present invention relates to a mobile terminal, and more particularly to, a method for receiving data in a mobile terminal and an apparatus thereof.

DESCRIPTION OF THE RELATED ART

With the development of mobile terminals, users are now able to download and enjoy large size movie files and other multimedia files through their mobile terminals. Specifically, users of Digital Multimedia Broadcast (DMB) phones are able to download a wide variety of multimedia data, such as real time audio and video and watch a variety of broadcasts.

Figure 1:
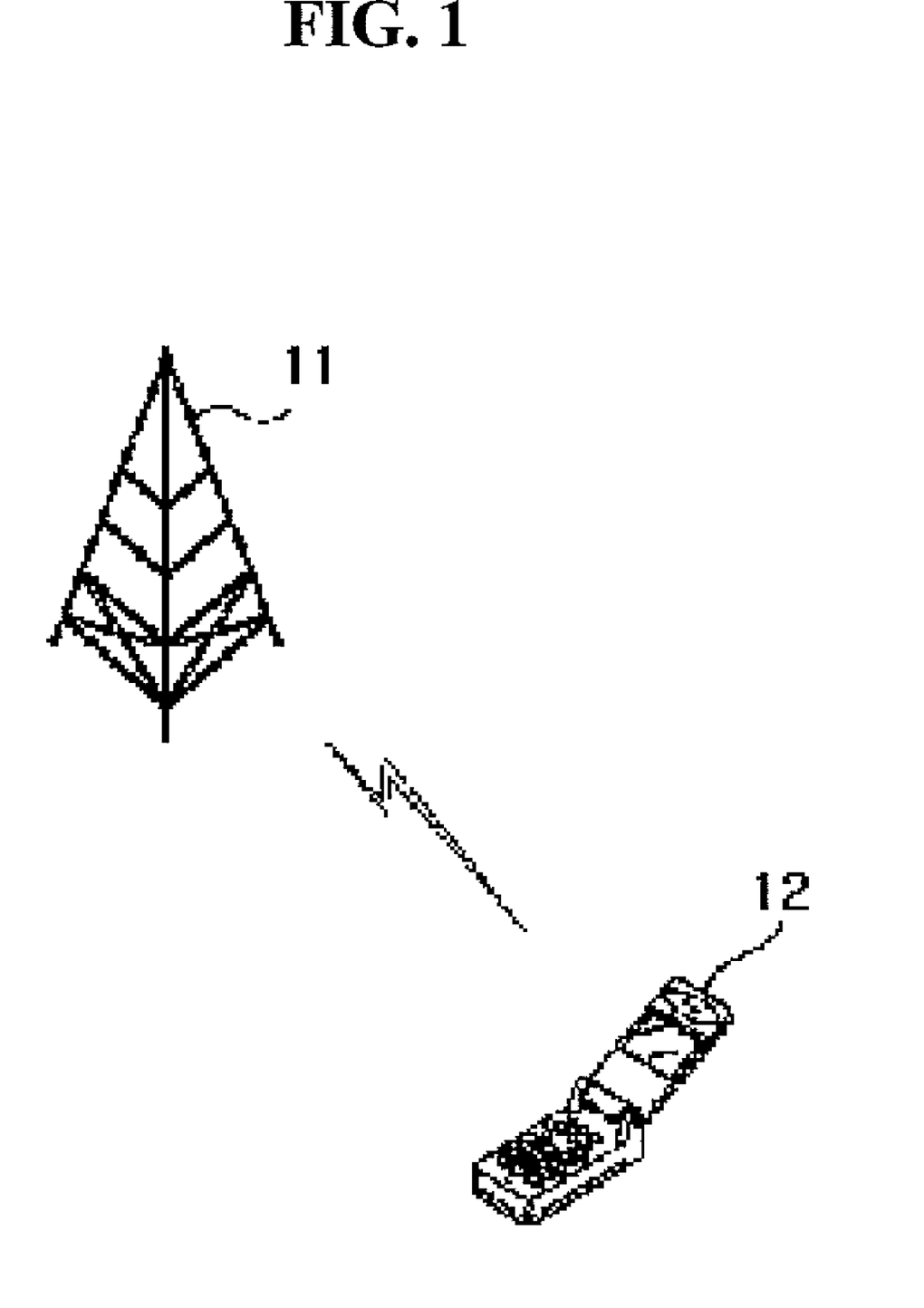
FIG. 1 is a schematic view showing a method for receiving data in a mobile terminal according to the related art.

When receiving the variety of multimedia data current mobile terminals receive multimedia data directly from a base station at a high data rate (HDR) of up to 2 Mbps. Current methods for receiving data in a mobile terminal, according to the related art will be described with reference to FIG. 1. As illustrated in FIG. 1, the mobile terminal 12 receives data directly from a base station 11 at a high data rate of up to 2 Mbps when receiving multimedia data. However, mobile terminals, such as DMB phones, have difficulty receiving multimedia data from a base station when the phone is located inside a building or in an underground structure.

Although the mobile terminal HDR can be up to 2 Mbps when receiving multimedia data, the mobile terminal user typically experiences a lower data reception rate in proportion to the greater the distance between the mobile terminal and the base station. The lower the mobile terminal HDR of reception, the more difficult it is for the mobile terminal, particularly, DMB phones, to receive multimedia data.

Accordingly, the method for receiving data in a mobile terminal, according to the related art, has another problem in that data cannot be received inside buildings or underground because data is directly received from the base station.

Further, the method for receiving data in a mobile terminal according to the related art has another problem in that the greater the distance to the base station, the less the data reception rate because data is directly received from the base station.

Therefore, there is a need for a system for effectively receiving multimedia data in a terminal for a mobile communication system when the user is in a low data reception area. The present invention addresses these and other needs.

SUMMARY OF THE INVENTION

An object of the present invention is to provide a method for receiving data of a mobile terminal, which can reduce the number of areas incapable of data reception by allowing a user's mobile terminal to receive data from a first mobile terminal with a good data reception state that receives data from a base station, rather than the user's mobile terminal directly receiving data from the base station.

Another object of the present invention is to provide a method for receiving data in a user's mobile terminal, which can improve the data reception rate of an area with a low data reception state by allowing a first mobile terminal with a good data reception state to receive data from a base station and send the received data to the user's mobile terminal, rather than the user directly receiving data from the base station, wherein the received data from the mobile terminal with the good reception state is received by a wireless communication method, and an apparatus thereof.

To accomplish the above objectives, a method for receiving data in a user's mobile terminal is provided, comprising the steps of determining that a rate at which the data can be received is less than a preset value, receiving information related to a rate at which at least one neighboring mobile terminal is receiving the data and information related to an interference level, selecting one of the at least one neighboring mobile terminal on the basis of the received information, setting a data reception path for receiving data through the selected neighboring mobile terminal, and receiving the data through the selected data reception path.

In one aspect of the present invention, the step of selecting one of the at least one neighboring mobile terminal further comprises determining whether there exists at least one mobile terminal among the at least one neighboring mobile terminal having a rate at which the data is being received that is greater than the preset value, wherein the step of selecting further comprises selecting a mobile terminal having a highest calculated ratio of the rate at which the data is received to the interference level if more than one mobile terminal among the at least one neighboring mobile terminal has a rate at which the data is being received that is greater than the preset value.

In another aspect of the present invention, when the direct data reception path is set, a continuous check is made to determine that the rate at which data is received remains greater than or equal to the preset value, wherein if the rate at which data is received is less than the preset value while the mobile terminal is receiving data, then the information related to the rate at which at least one neighboring mobile terminal is receiving the data and information related to the interference level is received, and at least one mobile terminal is selected based on the received information, wherein a new data reception path is set.

Moreover, to accomplish the above objectives, an apparatus is provided for receiving data in a mobile terminal according to the present invention, comprising a first determination unit adapted to determine that a rate at which the data can be received is less than a preset value, an information receiving unit adapted to receive information related to a rate at which at least one neighboring mobile terminal is receiving the data and information related to an interference level, a storage unit adapted to store the received data, a second determination unit adapted to determine whether there exist at least one mobile terminal among the at least one neighboring mobile terminal having a rate at which the data is being received that is greater than or equal to the preset value, a selection unit adapted to select one of the at least one neighboring mobile terminal on the basis of the received information, and a data reception path setting unit adapted to set a data reception path for receiving data through the selected neighboring mobile terminal. The apparatus further comprises a data receiving unit for receiving data from the base station through the set data reception path.

In another aspect of the present invention, the selection unit selects one of the at least one neighboring mobile terminal if there exists at least one mobile terminal among the at least one neighboring mobile terminal having a rate at which the data is being received that is greater than or equal to the preset value, wherein the data reception is terminated if no mobile terminal has a rate at which the data is being received that is greater than or equal to the preset value.

In still another aspect of the present invention, during data reception the first determination unit continuously checks at regular time intervals to determine that the rate at which data can be received is greater than or equal to the preset value, wherein if the rate at which data is received is less than the preset value while the mobile terminal is receiving data, then the information receiving unit receives the information related to the rate at which at least one neighboring mobile terminal receives the data and information related to the interference level, and the selection unit selects the mobile terminal having the highest calculated ratio of the rate at which the data is received to the interference level, wherein a new data reception path is set.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

In the drawings.

DETAILED DESCRIPTION OF THE PREFERRED EMBODIMENTS

The present invention relates to an apparatus and method for a user of a mobile terminal having a low data reception rate from a base terminal to receive multimedia data in the user's mobile terminal, via another mobile terminal having good data reception from the base station. Although the present invention is illustrated with respect to a mobile terminal device, it is contemplated that the present invention may be utilized with other multimedia communication devices, as well.

Description of the present invention will now be given in detail with reference to the FIGS. 2 to 4 with respect to a method and apparatus for reducing the number of areas that are incapable of providing high data reception. The present invention improves the data reception rate in areas with a low data reception state by allowing another mobile terminal within a good data reception location to receive data from the base station, and transmit the data to the user's mobile terminal rather than the user directly receiving the data from the base station, and then the user receives the received data from the mobile terminal with the good reception state by a wireless communication method, and an apparatus thereof.

The configuration and operation method of the mobile terminal according to the present invention, as explained hereinafter, will be described only to an extent necessary to understand the present invention, a description of the other parts will be omitted so as not to obscure the invention.

Further, the method and apparatus for a mobile terminal to receive data, according to the present invention and as explained hereinafter has a high utilization value for DMB (digital multimedia broadcast) phones that are incapable of receiving data in low reception area locations, such as inside buildings, in underground structures, and in situations where the data reception rate becomes low during the time of large scale data reception.

Figure 2:
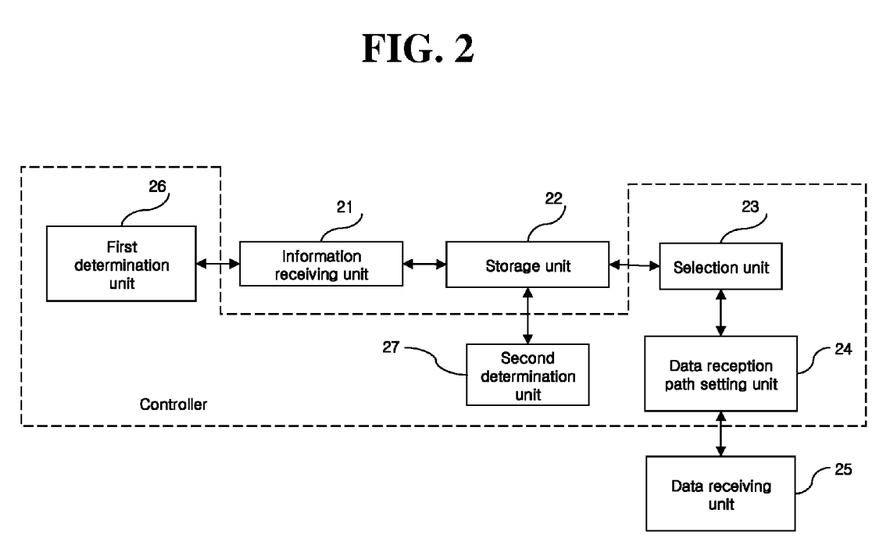
FIG. 2 is a block diagram showing the configuration of an apparatus for receiving data in a mobile terminal according to the present invention.

FIG. 2 is a block diagram illustrating the configuration of an apparatus for receiving data in a mobile terminal according to the present invention. As illustrated in FIG. 2, the apparatus for receiving data in a mobile terminal includes an information receiving unit 21, a storage unit 22, a selection unit 23, a data reception path setting unit 24, and a data receiving unit 25 for receiving data from the base station through the set data reception path.

The information receiving unit 21 receives information indicating the rate at which data is received, also referred to as the high data rate (HDR) of reception, and the interference level for at least one neighboring mobile terminal. Currently, mobile terminals receive multimedia data directly from a base station at a HDR of up to 2 Mbps. Here, the interference level includes the number of terminals using a particular frequency for wireless communication and the mobile terminal's distance from the base station.

The storage unit 22 is configured to store the HDR and the interference level information received in the information receiving unit 21. The selection unit 23 selects one or more specific mobile terminals on the basis of the received information of the HDR and number of interferences for the at least one neighboring mobile terminal. When a neighboring mobile terminal is selected based on the received information, then the data reception path setting unit 24 sets a data reception path for receiving data from the selected one or more mobile terminal, and the data receiving unit 25 receives the data from the base station through the set data reception path.

The apparatus for receiving data in a mobile terminal according to the present invention further comprises a first determination unit 26 adapted for determining whether the HDR of the user's own mobile terminal is more than a preset value, and a second determination unit 27 adapted for determining whether there exists a mobile terminal with a HDR that is more than a preset value among the one or more mobile terminals from which the information of the HDR and the information of the interference level was received.

In an embodiment of the present invention, the information receiving unit 21 and the data receiving unit 25 are put into operation by a wireless communication module being applied to the current mobile terminals. Preferably, the information receiving unit 21 and the data receiving unit 25 are put into operation through Ad-hoc and Bluetooth communication modules. The selection unit 23, the data reception path setting unit 24, the first determination unit 26 and the second determination unit 27 are put into operation by a software module programmed to execute their functions. The storage unit 22 is implemented by utilizing parts of a storage medium of an existing mobile terminal.

In another embodiment of the present invention, it is contemplated that a controller unit is adapted to control the information receiving unit, storage unit, and the data receiving unit to determine that the rate at which the data can be received is less than the preset value, to process the information received in the receiving unit, select one of the neighboring mobile terminals on the basis of the received information, and set a data reception path for receiving data through the selected neighboring mobile terminal.

Hereinafter, the method for receiving data of a mobile terminal according to the present invention will be described in detail with reference to FIGS. 2-5.

Figure 3:
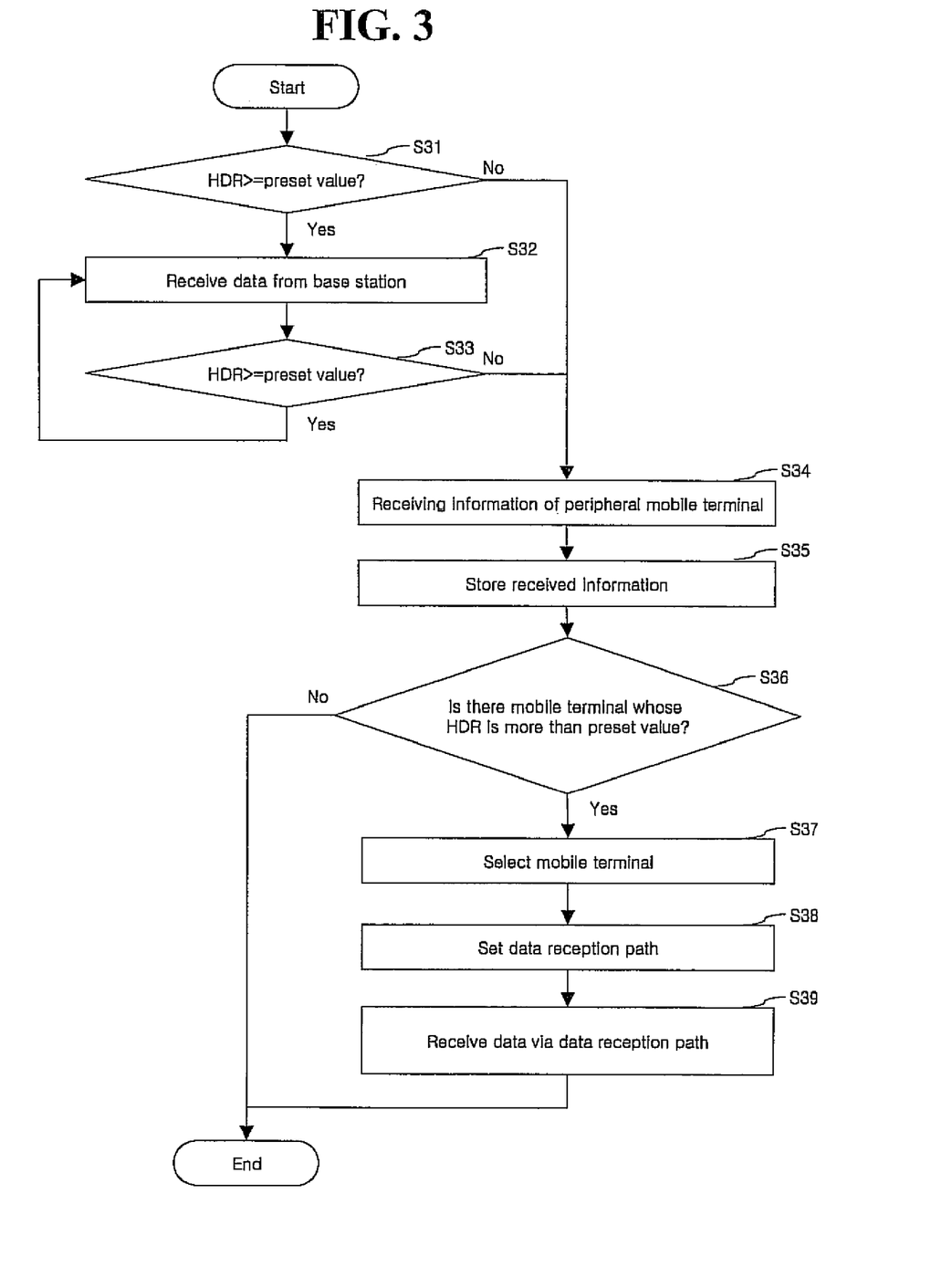
FIG. 3 is a sequential view showing a method for receiving data in a mobile terminal according to the present invention.
Figure 4:
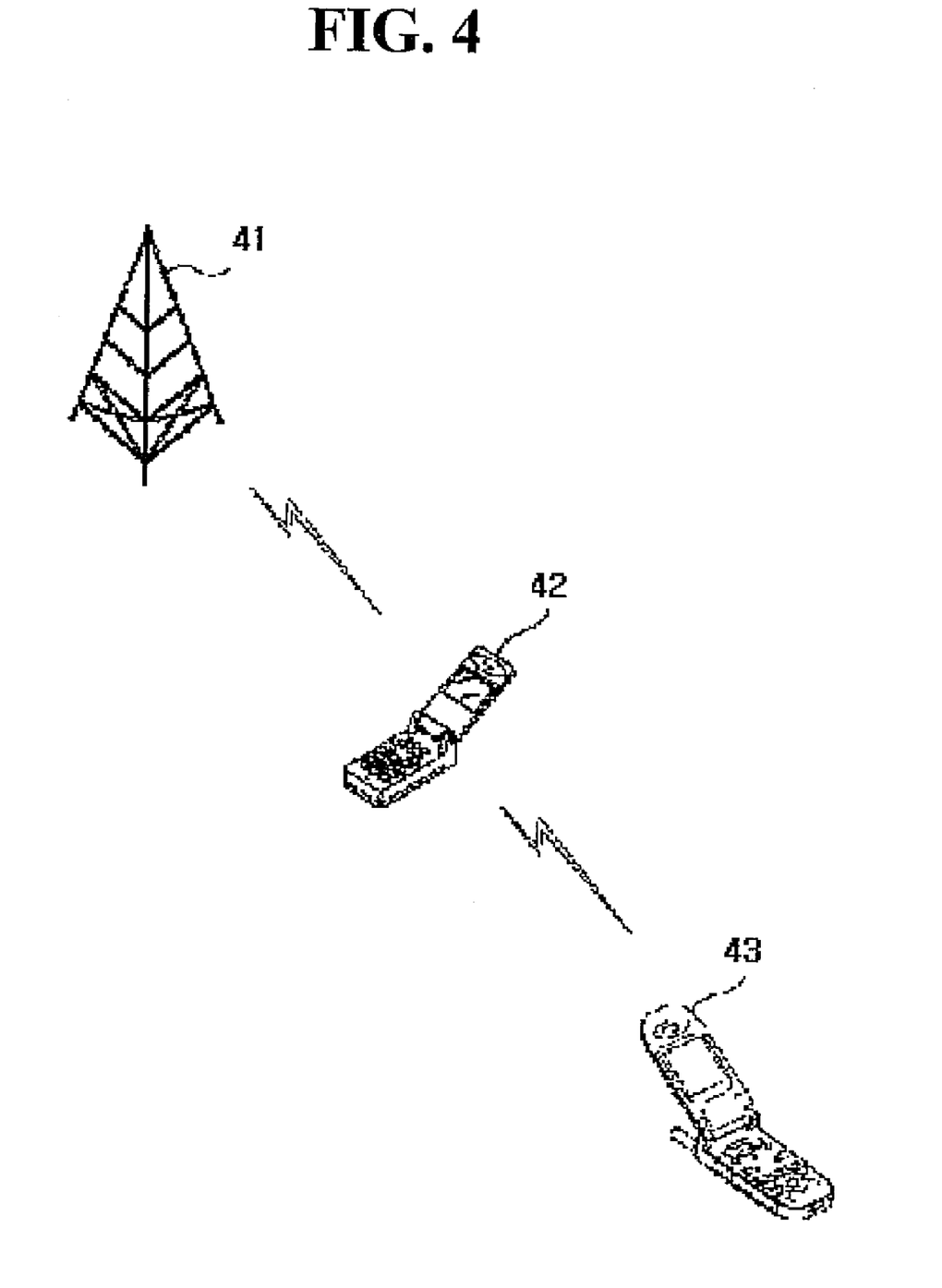
FIG. 4 is a view of one embodiment showing a reception path in the method for receiving data in a mobile terminal according to the present invention.

FIG. 3 is a sequential flow diagram showing a method for receiving data of a mobile terminal according to the present invention. As illustrated in FIG. 3, the method for receiving data in a mobile terminal comprises the steps of first determining whether the HDR of a user's own mobile terminal is more than a preset value (S31). If the HDR of the user's own mobile terminal is not more than the preset value, then receiving information related to the HDR of at least one mobile terminal and information related to an interference level (S34), and storing the received information (S35). Next, determining whether there exists a mobile terminal with a HDR greater than or equal to the preset value among the one or more mobile terminals from which the information on the HDR and the information related to the interference level (S36) was received. If there exists a mobile terminal with a HDR greater than or equal to the preset value, then selecting one or more specific mobile terminal on the basis of the received information (S37), setting a data reception path for receiving data of including the selected one or more mobile terminal (S38), and receiving data from the base station through the set data reception path (S39).

The operation of the apparatus for receiving data of a mobile terminal according to the present invention will now be described in detail with reference to FIGS. 3 and 4. First of all, if a user wants to get service through a mobile terminal 43, such as a DMB phone, the first determination unit 26 determines whether the HDR of the user's own mobile terminal 43 is greater than or equal to a preset value (S31). For example, when a user wants to receive a desired service, e.g., DMB service, through a mobile terminal, the HDR of the user's own mobile terminal 43 is checked to see if the mobile terminal is able to receive data from a base station 41 at a sufficient data reception rate.

As a result of the first determination step (S31), if the HDR is more than the preset value, the user's own mobile terminal 43 receives data from the base station 41, (S32). During the data transmission, the first determination unit 26 continuously checks at regular time intervals to determine the HDR of the user's own mobile terminal 43, (S33).

On the contrary, if the HDR is less than the preset value (S31) or if HDR is less than the preset value while the mobile terminal is receiving data (S33), the information receiving unit 21 receives information on the HDR of at least one mobile terminal located within a predetermined distance and information on the interference level (S34). Here, the information receiving unit 21 receives the information related to the HDR and the information related to the interference level directly from the one or more neighboring mobile terminals 42. The predetermined distance depends on the wireless communication possible distance which is a function of the wireless communication unit.

The storage unit 22 stores the received information of the HDR and the received information on the number interferences in a table format (S35).

The second determination unit 27 determines whether there exists at least one mobile terminal with a HDR that is more than a preset value from among the one or more mobile terminals from which the information receiving unit 21 received the information on the HDR and the information on the number interferences (S36). If the HDR from among the one or more mobile terminals is less than the preset value, the user's own mobile terminal 43 does not receive the desired service and displays a termination notice message and terminates data reception.

In contrast, if the high data rate (HDR) is greater than or equal to the preset value, the selection unit 23 selects one or more specific mobile terminal on the basis of the stored HDR and number interferences (S37). Here, the selection unit 23 selects a first mobile terminal 42 having the largest value when the high data rate is divided by the number of interferences among the at least one mobile terminal. If the value obtained by dividing the high data rate of the selected first mobile terminal by the interference level is greater than or equal to the preset value, then only the first mobile terminal is selected. However, if the value of the selected first mobile terminal 42 obtained by dividing the high data rate by the number of interferences is less than the preset value, the selection unit additionally selects a second mobile terminal having the largest value when the high data rate is divided by the number of interferences among the one or more mobile terminals on the basis of the information on the high data rate of the one or more mobile terminals stored and information on the number interferences stored in the selected first mobile terminal. Accordingly, the method of selecting a mobile terminal is enabled multiple times in the above manner.

The data reception path setting unit 24 sets a data reception path for receiving data from the selected one or more specific mobile terminals 42, (S38). If the selected mobile terminal is the only mobile terminal selected, the data reception path is set in the order of the base station 41, the first selected mobile terminal 42 and the user's own mobile terminal 43, FIG. 4.

Figure 5:
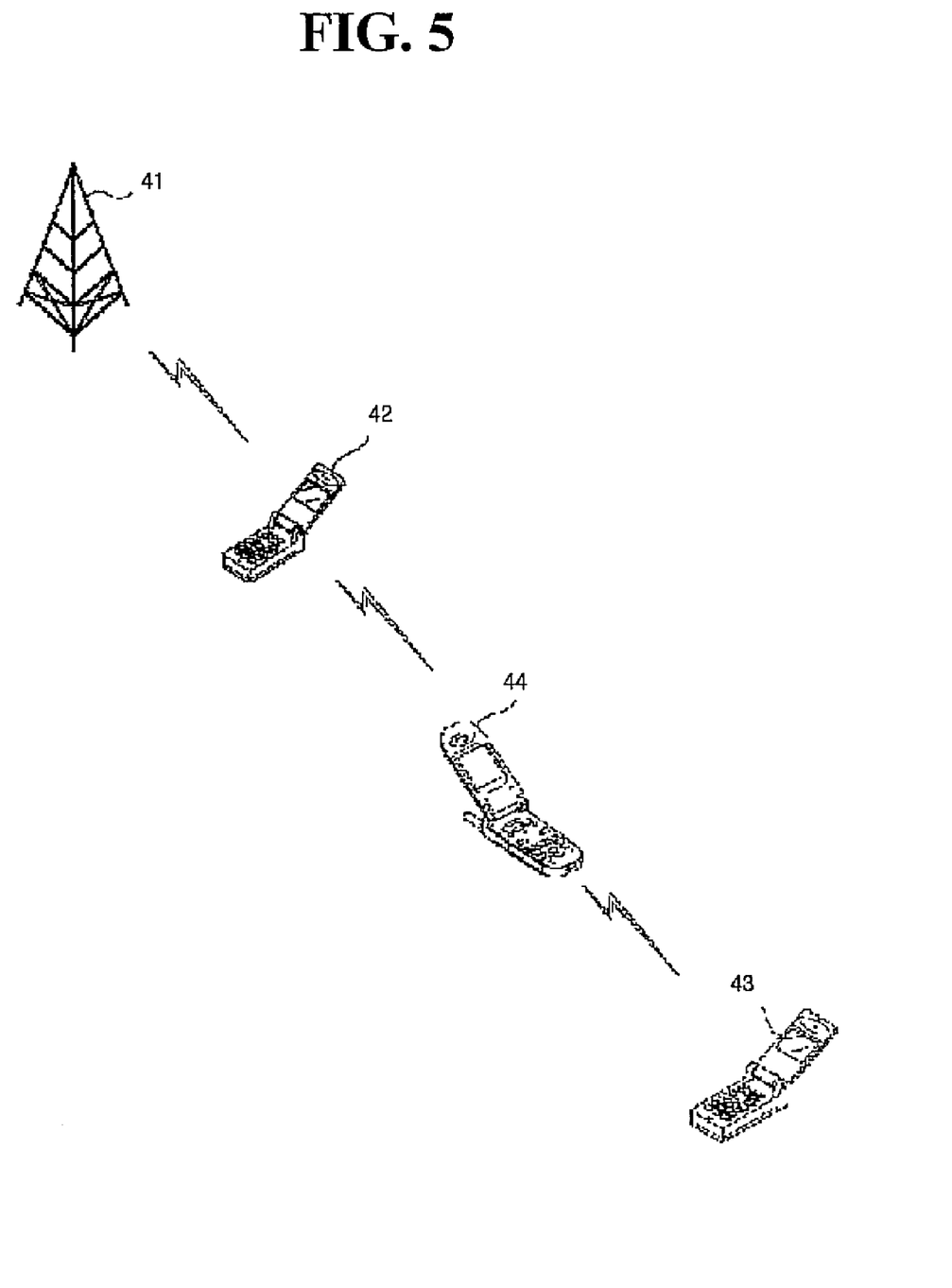
FIG. 5 is a view of another embodiment showing a reception path in the method for receiving data in a mobile terminal according to the present invention.

In an alternative embodiment of the present invention, as shown in FIG. 5, if the selected path includes a second mobile terminal 44 in addition to the first mobile terminal 42, then the data reception path is set in the order of the base station 41, the first mobile terminal 42, the second mobile terminal 44 and the user's own mobile terminal 43.

The data receiving unit 25 receives data from the base station through the set data reception path (S39). Preferably, the data receiving unit 25 is a wireless communication unit for receiving data from the mobile terminals constituting the set data reception path. The wireless communication unit includes an AD-Hoc or Bluetooth communication module. For example, as shown in FIG. 4, in the event that the data reception path is set in the order of the base station 41, the first mobile terminal 42 and the user's own mobile terminal 43, the first mobile terminal 42 receives data from the base station 41, and the user's own mobile terminal 43 then receives the received data from the first mobile terminal 42 through the wireless communication unit.

Further, as shown in FIG. 5, in the event that the data reception path is set in the order of the base station 41, the first mobile terminal 42, the second mobile terminal 44 and the user's own mobile terminal 43, the first mobile terminal 42 receives data from the base station 41, the second mobile terminal 44 then receives the data received by the first mobile terminal 42 through the wireless communication unit, and the user's own mobile terminal 43 then receives the data received by the second mobile terminal 44. Those skilled in the art of the present invention will appreciate that this method is not limited to two mobile terminals but can be expanded as required for HDR reception of multimedia data.

If the order of magnitude of the values obtained by dividing the high data rate (HDR) of the at least one mobile terminal by the number of interferences is changed while data is being received from the base station via the data reception path, the selection unit 23 changes the previously selected mobile terminal to a mobile terminal having the largest value when the current high data rate (HDR) is divided by the number of interferences, and accordingly changes the data reception path too, thereby improving the data reception rate.

Namely, in the aforementioned method, even if the user's own mobile terminal 43 is in an area incapable of receiving data, specifically, an area incapable of receiving DMB service, the method for receiving data in a mobile terminal and the apparatus thereof according to the present invention can provide DMB service through the first mobile terminal 42 or through the first and second mobile terminals 42 and 44.

Moreover, if the user's own mobile terminal 43 is in the area where the data reception rate is low, the method for receiving data in a mobile terminal and the apparatus thereof according to the present invention can improve the data reception rate through the first mobile terminal 42 or through the first and second mobile terminals 42 and 44.

The data rate between the base station and the mobile terminal is a HDR of up to 2 Mbps. The data rate between the mobile terminals through the wireless communication unit is about 11 Mbps in case of an AD-Hoc or Bluetooth communication module. Therefore, the objects of the present invention are accomplished even though data is received through a plurality of mobile terminals as set forth above.

Meanwhile, if the data rate between the base station and the mobile terminal is further increased through technical development, the reception rate in the method for receiving data of a mobile terminal and the apparatus thereof according to the present invention can be further increased because the data rate between the mobile terminals through the wireless communication unit is high.

The embodiments described above are simply intended to clarify the technical concept of the present invention. Of course, the present invention should not be limited to the embodiments described above in interpreting the technical scope of the present invention. The present invention can be worked in variously modified fashions within the spirit of the present invention and within the scope defined by the accompanying claims.

As described above in detail, the method for receiving data in a mobile terminal and the apparatus thereof according to the present invention can reduce the areas incapable of data reception by allowing a user's mobile terminal to receive data from another mobile terminal having a good data reception state for receiving the data from a base station, rather than the user's mobile terminal directly receiving data from the base station. Wherein the user's mobile terminal receives the received data from the mobile terminal with the good reception state by a wireless communication method.

Likewise, the method for receiving data in a mobile terminal and the apparatus thereof according to the present invention can improve the data reception rate in an area with a low data reception state by allowing a mobile terminal having a good data reception state to receive data from a base station and send the data to the user's mobile terminal, rather than the user directly receiving data from the base station.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for receiving data in a mobile terminal, comprising:
   determining a rate at which the data can be received from a base station;
   receiving information from at least one neighboring mobile terminal, the information related to a rate at which the at least one neighboring mobile terminal is receiving the data and also related to an interference level;
   selecting one or more of the at least one neighboring mobile terminals on the basis of the received information if it is determined that the rate at which data can be received from the base station is less than a preset value;
   setting a data reception path for receiving the data from the base station through the selected one or more neighboring mobile terminals if it is determined that the rate at which data can be received from the base station is less than the preset value; and
   receiving the data sequentially from the base station through the set data reception path comprising the selected one or more neighboring mobile terminals if it is determined that the rate at which data can be received from the base station is less than the preset value.

2. The method of claim 1, further comprising setting a direct data reception path from the base station if it is determined that the rate at which data can be received from the base station is greater than or equal to the preset value.

3. The method of claim 2, wherein when the direct data reception path is set a continuous check is made to determine that the rate at which data can be received remains greater than or equal to the preset value.

4. The method of claim 3, wherein if the rate at which data is received is less than the preset value while the mobile terminal is receiving the data, the information related to the rate at which at least one neighboring mobile terminal is receiving the data and information related to the interference level is again received and at least one neighboring mobile terminal is selected based on the received information in order to set a new data reception path.

5. The method of claim 1, wherein selecting the one or more of the at least one neighboring mobile terminals further comprises determining whether there exists at least one mobile terminal among the at least one neighboring mobile terminal having a rate at which the data is being received that is greater than the preset value.

6. The method of claim 5, wherein selecting the one or more of the at least one neighboring terminals further comprises selecting a mobile terminal having a highest calculated ratio of the rate at which the data is received to the interference level if more than one mobile terminal among the at least one neighboring mobile terminal has a rate at which the data is being received that is greater than the preset value.

7. The method of claim 5, wherein the mobile terminal data reception is terminated if no mobile terminal among the at least one neighboring mobile terminal has a rate at which the data is being received that is greater than or equal to the preset value.

8. The method of claim 1, wherein the rate at which data is received through the set data reception path is a high data rate.

9. The method of claim 1, wherein receiving data through the set data reception path comprises receiving digital multimedia broadcast data.

10. The method of claim 1, wherein:
two or more of the at least one neighboring mobile terminals are selected;
the data reception path is set through the selected two or more neighboring mobile terminals in series; and
the data from the base station is received through the set data reception path comprising the selected two or more neighboring mobile terminals in series.

11. A mobile terminal for receiving data, comprising:
an information receiving unit adapted to receive information from at least one neighboring mobile terminal, the information related to a rate at which the at least one neighboring mobile terminal is receiving the data and also related to an interference level;
a storage unit adapted to store the information received by the information receiving unit;
a data receiving unit adapted to receive the data; and
a controller adapted to control the information receiving unit, storage unit, and data receiving unit to determine that a rate at which the data can be received from a base station is less than a preset value, process the information received by the information receiving unit, select one or more of the at least one neighboring mobile terminal on the basis of the received information, and set a data reception path for receiving the data sequentially from the base station through the selected one or more neighboring mobile terminal.

12. The mobile terminal of claim 11, wherein the data reception path for receiving the data through the selected one or more neighboring mobile terminal originates from the base station.

13. The mobile terminal of claim 11, wherein the controller terminates the data reception if none of the at least one neighboring mobile terminal has a rate at which the data is being received that is greater than or equal to the preset value.

14. The mobile terminal of claim 13, wherein the controller selects the neighboring mobile terminal having a highest calculated ratio of the rate at which the data is received to the interference level if more than one of the at least one neighboring mobile terminal has a rate at which the data is being received that is greater than or equal to the preset value.

15. The mobile terminal of claim 11, wherein the rate at which data is received from the base station is a high data rate.

16. The mobile terminal of claim 11, wherein the data received through the set data reception path comprises digital multimedia broadcast data.

17. The mobile terminal of claim 11, wherein the controller continuously checks at regular time intervals to determine that the rate at which the data is received from the base station is greater than or equal to the preset value.

18. The mobile terminal of claim 17, wherein if the rate at which the data is received from the base station is determined to be less than the preset value while the mobile terminal is receiving the data, the controller receives the information related to the rate at which at least one neighboring mobile terminal receives the data and information related to the interference level again and at least one mobile terminal is selected based on the received information in order to set a new data reception path.

19. The mobile terminal of claim 11, wherein:
the controller is further adapted to select two or more of the at least one neighboring mobile terminals;
the controller is further adapted to set the data reception path through the selected two or more neighboring mobile terminals in series; and
the data receiving unit is further adapted to receive the data from the base station through the set data reception path comprising the selected two or more neighboring mobile terminals in series.

20. A mobile terminal for receiving data, comprising:
a first determination unit adapted to determine that a rate at which the data can be received from a base station is less than a preset value;
an information receiving unit adapted to receive information from at least one neighboring mobile terminal, the information related to a rate at which the at least one neighboring mobile terminal is receiving the data and also related to an interference level;
a storage unit adapted to store the received information;
a second determination unit adapted to determine whether there exists at least one mobile terminal among the at least one neighboring mobile terminal having a rate at which the data is being received that is greater than the preset value;
a selection unit adapted to select one or more of the at least one neighboring mobile terminal on the basis of the received information;
a data reception path setting unit adapted to set a data reception path for receiving the data from the base station through the selected one or more neighboring mobile terminal; and
a data receiving unit adapted to receive data from the base station through the set data reception path comprising the selected one or more neighboring mobile terminal.

21. The mobile terminal of claim 20, wherein the data reception is terminated if no mobile terminal among the at least one neighboring mobile terminal has a rate at which the data is being received that is greater than or equal to the preset value.

22. The mobile terminal of claim 21, wherein the selection unit selects a mobile terminal having a highest calculated ratio of the rate at which the data is received to the interference level if more than one mobile terminal among the at least one neighboring mobile terminal has a rate at which the data is being received that is greater than or equal to the preset value.

23. The mobile terminal of claim 22, wherein during data reception the first determination unit continuously checks at regular time intervals to determine that the rate at which the data is received through the set data reception path is greater than or equal to the preset value.

24. The mobile terminal of claim 23, wherein if the rate at which the data is received is less than the preset value while the mobile terminal is receiving the data, the information receiving unit receives the information related to the rate at which at least one neighboring mobile terminal receives the data and information related to the interference level again and the selection unit selects the mobile terminal having the highest calculated ratio of the rate at which the data is received to the interference level in order to set a new data reception path.

25. The mobile terminal of claim 20, wherein the rate at which data is received through the set data reception path is a high data rate.

26. The mobile terminal of claim 20, wherein the data received through the set data reception path comprises digital multimedia broadcast data.

27. The mobile terminal of claim 20, wherein:
- the selection unit is further adapted to select two or more of the at least one neighboring mobile terminals;
- the data reception path setting unit is further configured to set the data reception path through the selected two or more neighboring mobile terminals in series; and
- the data receiving unit is further adapted to receive the data from the base station through the set data reception path comprising the selected two or more neighboring mobile terminals in series.

* * * * *